J. BARBOW.
SURVEYING INSTRUMENT.
APPLICATION FILED JUNE 3, 1909.
991,598.
Patented May 9, 1911.
3 SHEETS—SHEET 1.
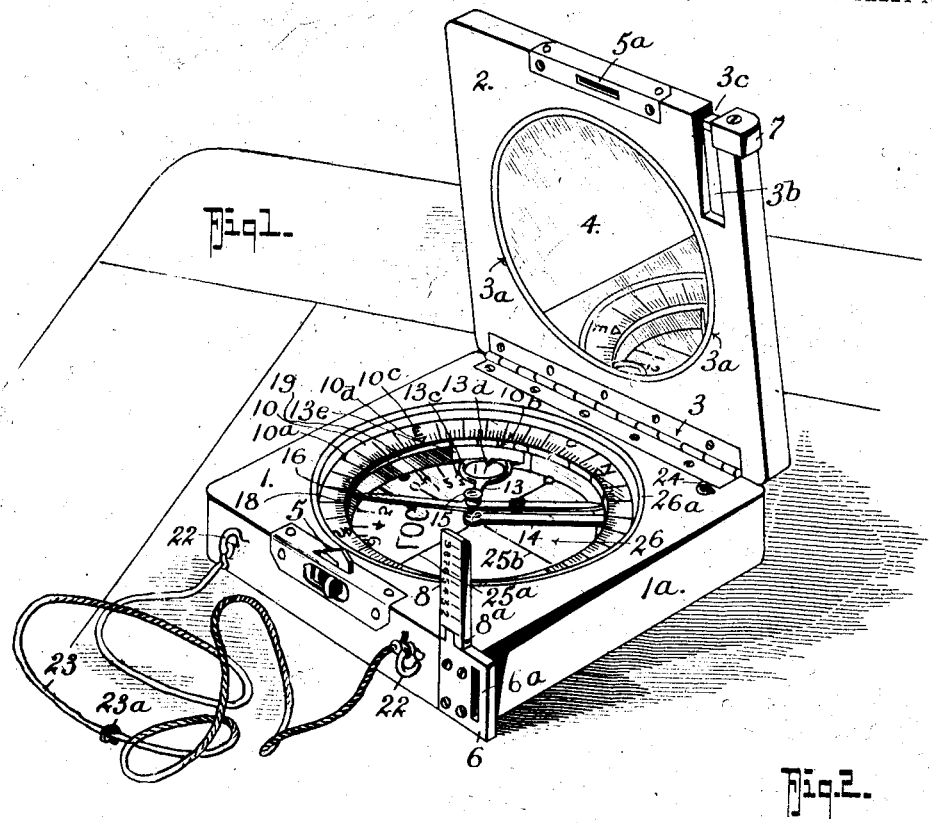
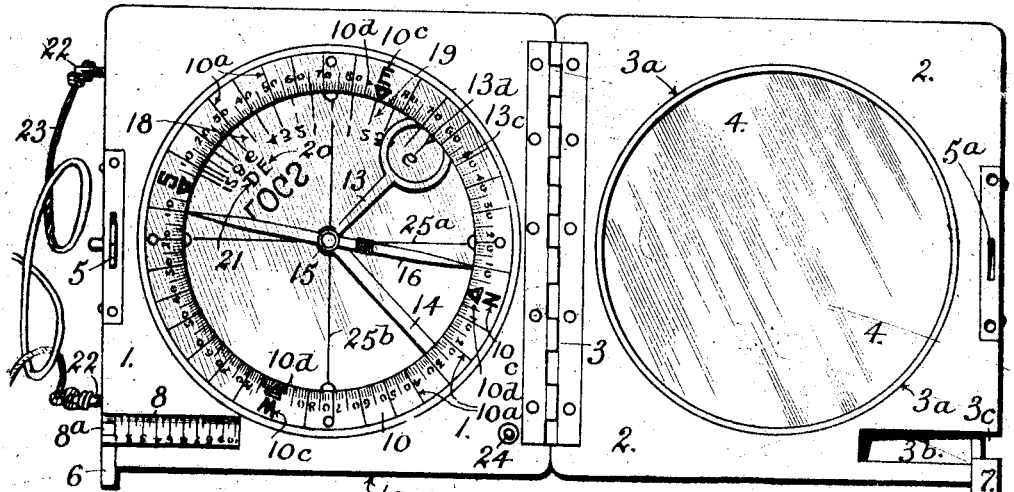
WITNESSES:
J. Theodore Dehrott
May E. Immich
INVENTOR
Joseph Barbow
BY
Fred G. Dieterich & Co.
ATTORNEYS

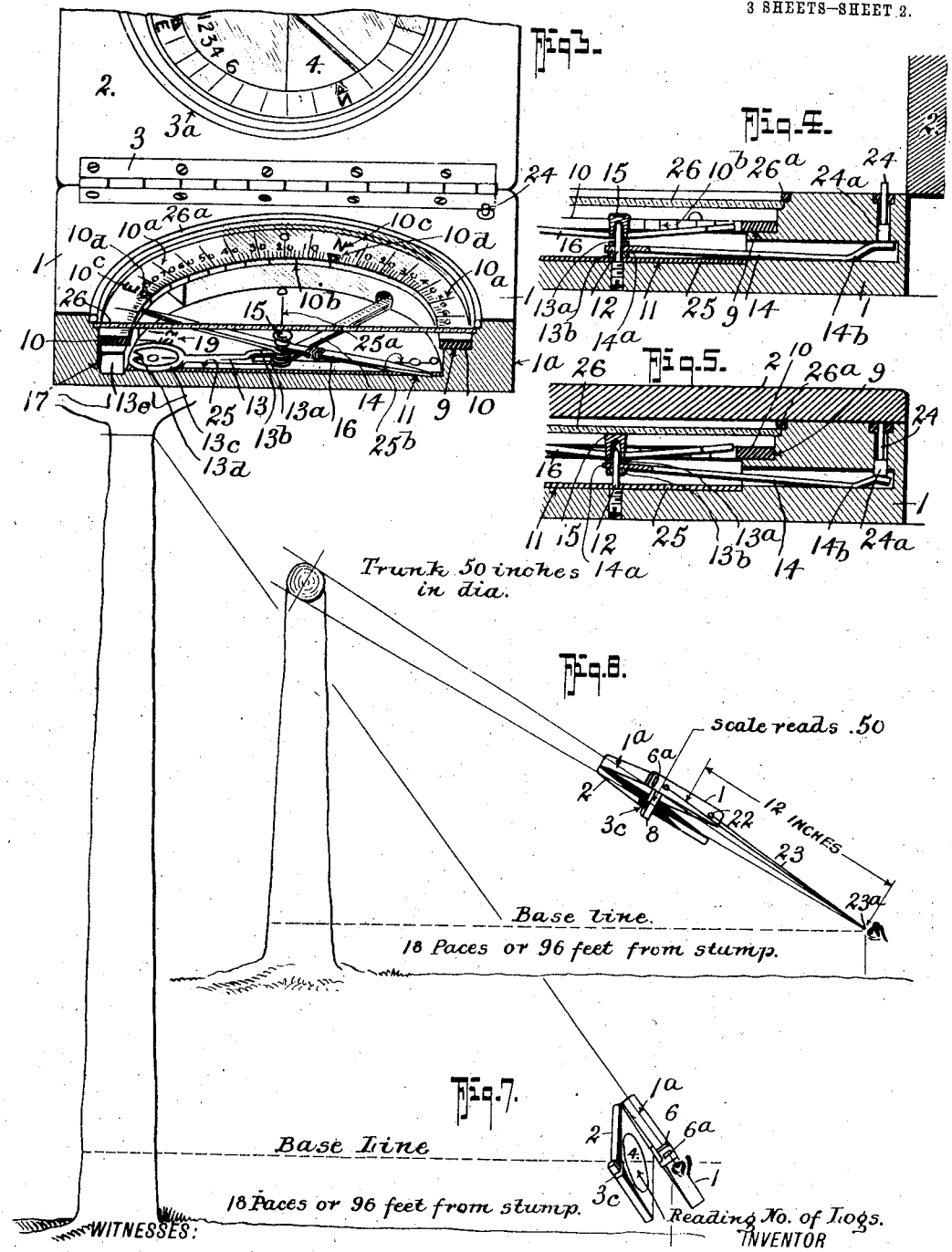

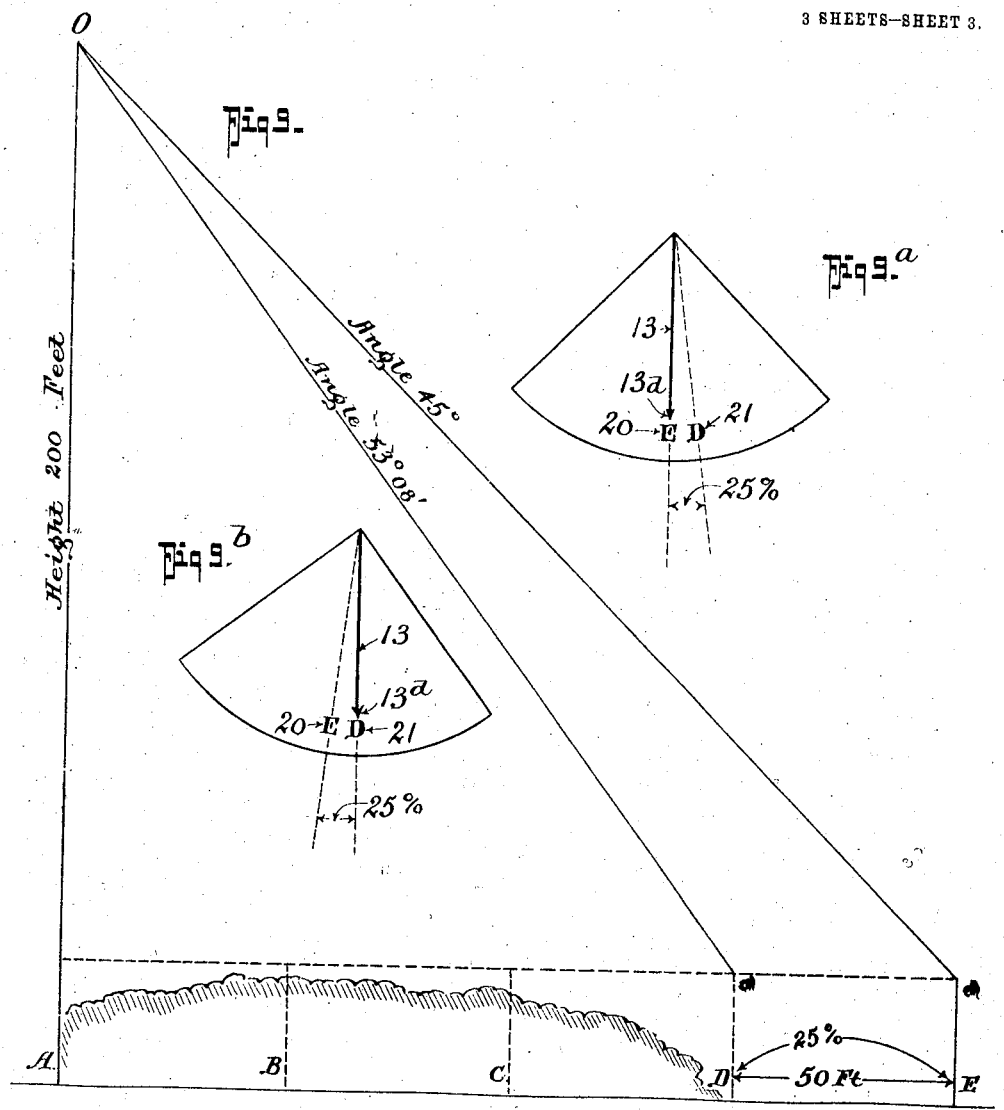

UNITED STATES PATENT OFFICE.

JOSEPH BARBOW, OF PORTLAND, OREGON.

SURVEYING INSTRUMENT.

991,598. Specification of Letters Patent. Patented May 9, 1911.

Application filed June 3, 1909. Serial No. 499,947.

*To all whom it may concern:*

Be it known that I, JOSEPH BARBOW, residing at Portland, in the county of Multnomah and State of Oregon, have invented certain new and useful Improvements in Surveying Instruments, of which the following is a specification.

My invention relates to certain new and useful improvements in surveying instruments, and it particularly seeks to provide a simple and compact instrument, particularly adapted for loggers' use in surveying standing timber and the like, and in its generic nature the invention comprises an instrument having a compass, a gravity operated indicator for indicating angles of elevation and depression, a log division coöperating with the indicator, a reading mirror, a pair of sights and a folding scale for the purpose of determining the number of logs in a tree and the diameter of the tree at the point of mean height.

My invention also has for its object to provide an instrument embracing in a single device the various parts and elements necessary in determining the contents of standing timber and compassing in the forest.

In my invention means are also provided for determining at a glance the number of logs in a standing tree, and means are also provided whereby the scales may be read by the operator while sighting with the instrument, such means residing in a mirror provided to reflect the scale and give a view thereof to the operator, regardless of his position, within certain limits.

My invention also includes a scale or raised circle divided into quadrants and graduated in degrees from "0" to "90" each way, cardinal letters being provided on said circle and a conspicuous pointer is provided at each of said letters. The letters E and W are reversed and the variation turned off and set to accord with the particular locality in which the instrument is to be used. The inner edge of the raised circle is graduated to harmonize with the several corners bounding a section.
My invention also includes a needle lifter to automatically dampen the needle when the instrument is closed, or at the will of the operator, and it also includes means for preventing the needle lifter from sticking or adhering in its upward position when it should be downward. The needle lifter serves both as a lock for the compass needle and for the indicator when the instrument is not in use.

My invention also includes those novel details of construction, combination and arrangement of parts, all of which will be first described in detail, then be specifically pointed out in the appended claims and illustrated in the accompanying drawings, in which:

Figure 1, is a perspective view of my invention, the cover or lid being partly open. Fig. 2, is a plan view thereof. Fig. 3, is an enlarged sectional perspective view of my instrument. Figs. 4 and 5, are detail sections hereafter referred to. Fig. 6, is a detail view of the sights. Fig. 7, is a diagrammatic view illustrating the manner of determining the height of a tree expressed in number of 16 feet logs. Fig. 8, is a similar view illustrating the manner of determining the diameter of a tree. Figs. 9, 9ª and 9ᵇ, are diagrammatic views illustrating the application of my invention when the base line is not directly determinable.

Referring now to the accompanying drawings in which like letters and numerals of reference indicate like parts in all of the figures 1 represents the compass box to which a lid 2 is hinged at 3, the lid 2 being recessed at 3ª to receive a mirror 4. The lid is also recessed at 3ᵇ and 3ᶜ to receive the folding sight scale 8. A latch 5—5ª serves to hold the lid shut when the instrument is not in use.

At one corner the box 1 has a sight plate 6 which has a slot 6ª whose edge 6ᵇ lies in the same plane as that of the surface 1ª of the box so that such box surface 1ª may be used as a straight sighting edge in the practical application of my invention. A second sight 7 is placed on the lid corner opposite the box corner which contains the sight 6, while a scale 8 is hinged at 8ª to the sight 6 to coöperate with the sights 6 and 7 in determining the width of a tree. The scale 8 is graduated in hundredths of an inch to correspond with the width of a tree in inches.

The box 1 has a pocket having a seat 9 on which a ring-like scale plate 10 is secured. The plate 10 is graduated at 10ª into degrees running from "zero" to 90 degrees in each quadrant. The cardinal points, "north," "south," "east" and "west" are indicated by the respective letters "N," "S," "E," and "W," as at 10ᶜ and are also provided with bold indicating marks 10ᵈ, as shown clearly in Figs. 1 and 2 of the drawings. The scale 10 has its variations turned off and set for the particular locality in which the instrument is to be used. The scale 10 is also graduated on its inner edge at 10ᵇ to harmonize with the several corners bounding a section of land.

The pocket 11 of the box 1 has its bottom covered by a scale plate 25 having lines 25ᵃ—25ᵇ running respectively due north and south and due east and west. The scale 25 is also graduated in logs as at 19, running from "0" to "6", and as at 18 running from "1" to "12". I also provide a letter, say the letter "E" as indicated at 20 in the drawings on the scale 25 to designate the 45 degree angle and another letter, say the letter "D" indicated at 21 in the drawings to designate an angle of 53° 08′ for a purpose hereinafter explained. The indicating letter "E" indicating the 45° angle, corresponds to the scale line 6 of the scale 18 and the letter "D" corresponds to the indicating line 8 of the scale 18, which letters "E" and "D" respectively serve to render the indicating marks 6 and 8 distinctive.

On a pin 12 projecting through the bottom of the box and concentric with the scales 10ᵃ—10ᵇ—18—19, is a pendulum 13 having a pair of forked bearing members 13ᵃ—13ᵇ to receive the pin 12, such bearing members being formed at one end of the pendulum 13, while a weight 13ᶜ is provided at the other end thereof to ride in a groove 17 cut into the seat 9 beneath the scale plate 10. The pendulum 13 also has an eye 13ᵉ and an indicating pointer 13ᵈ, the pointer 13ᵈ coöperating with the scales 18—19.

Above the bearing ends 13ᵃ—13ᵇ a compass needle 16 has a bearing 15 mounted on the pin 12, while a needle lifter 14 has its eye 14ᵃ pierced by the pin 12 and held between forked bearing eyes 13ᵃ—13ᵇ of the pendulum 13.

The lifter 14 is a lever fulcrumed at 14ᵇ and engaged by the head 24ᵃ of a pin 24 that is held to be engaged by the lid 2 when closed to lift the needle 16 off the pin 12 and hold it against the glass cover plate 26 that is held over the pocket 11 of the box 1 by a spring locking wire 26ᵃ as clearly shown in Figs. 4 and 5 of the drawings.

The instrument may be carried about by a non-elastic cord 23 secured to eyes 22 and the cord 23 is knotted at 23ᵃ at a distance of 12 inches from the box 1 or sight for a purpose hereinafter made clear.

It is to be noted that the "east" and "west" marks 10ᶜ Fig. 2, of the drawings, are reversed on the scale 10 from the usual position they assume on scales of this type. The numbers and letters on the scale plate 25 are individually reversed to read correctly in the mirror 4.

By providing the pendulum 13 with bearings 13ᵃ—13ᵇ to straddle the needle lifter the weight of the pendulum 13 will alwa serve to force the needle lifter 14 dov wardly into the position shown in Fig. when the lid is open and prevent sticki thereof, so that the needle 16 will have f movement on the pin 12. The needle lif serves both as a stop for the compass need and for the weighted indicator member wh the instrument is not in use as the need lifter is held in the position indicated Fig. 5, to hold the needle 16 and the pend lum member 13 tightly against the glass and prevent them moving around when t lid of the box is closed.

Having thus briefly described the constru tion of my invention I will now proceed make its practical application clear. St pose it is desired to estimate the number 16 feet logs in a tree. The operator pac off a distance of 18 double paces from t tree (96 feet) to give a base line. Locati his eye at the end of such base line, he sigh through the sight aperture 6ᵃ of sight along the edge 1ᵃ of the case 1 to the top the tree and reads the indication of the pe dulum pointer 13ᵈ on the long scale 18, whi gives him directly the number of logs in t tree above the horizontal base line. (S Fig. 7.) In practice the base line is alwa taken horizontally and preferably at a heig equal to the height of the stump. Shou the base line be taken above the height of t stump the operator will then sight dow wardly to the top of the stump and obta a reading on the scale 19, which, when add to that of the scale 18 will give the tot number of logs in the tree.

To obtain the mean or other diameter the tree so that the amount of timber in t tree may be estimated, or for any other pu pose, the operator opens the scale 8 to ent the recess 3ᶜ of the lid 2 to bring the sigh 6 and 7 into operative relation to o another. Then by standing at the sa point 18 paces from the tree and holdi the cord 23 with the knot 23ᵃ at the eye an sighting between the sights 6 and 7, closi the lid 2 to bring the sights 6 and 7 into a parent contact with the sides of the tree, t diameter of the tree at the desired poi may be read off the scale. For examp suppose the scale reading to be 0.40, the c ameter of the tree will be 40 inches, e This reading on the scale 8 will be foun precise enough for all trees containing n more than four logs, but where the tree co tains more than four logs a certain corre tion of the reading must be made. The cc rections necessary have been determin from practice and will be found in Barbov booklet on *Tree Scale and Section Diagra* copyrighted 1909, hereinafter again referr to. In estimating the number of logs in tree it is not always convenient to pace off the base line owing to the inaccessibility of the trees or for other reasons. In that case (see Figs. 9, 9ª and 9ᵇ) the height of tree in logs, or in feet may be had by sighting through the sight 6 along the casing edge 1ª and holding the instrument with the edge 1ª at an angle of 45° to the horizontal, and then walking toward or from the tree as may be necessary to focus the sight. The angle of 45° may be found by permitting the pointer 13ᵈ of the pendulum 13 to rest at the indication letter "E" (see Fig. 9ª). The operator then walks straight toward the tree, still sighting for the top, until the pointer 13ᵈ registers with the letter D on the scale 25 (see Fig. 9ᵇ) when the straight edge will be at an angle of 53° 8' to the horizontal and the distance covered "E—D" on the base line A—E (see Fig. 9) will be equal to one-fourth the total length of the base line, or in other words E—D equals one-fourth of E—A thus should E—D be found to be 50 feet for example, A—E will be 200 feet and as A—E equals A—O (see Fig. 9) the tree will be found to be 200 feet high and thus it is easy to determine the number of logs by simply dividing such number of feet by 16. The number of logs found in the tree will be 12¼. In a like manner the height of other objects may be determined as well as horizontal distances.

My invention is particularly designed for use in connection with a booklet published by me in 1909 known as Barbow's booklet in *Tree Scale and Section Diagram* (copyrighted 1909) wherein numerous tables are given for use in connection with my instrument whereby its use is largely extended and wherein may be found the necessary data for correcting any variations in the direct reading of the scales.

Slight changes in the details of construction may be made without departing from the spirit of the invention or the scope of the appended claims.

From the foregoing description taken in connection with the accompanying drawings it is thought the complete construction, operation and numerous advantages of my invention will be readily understood.

What I claim is:

1. In an instrument of the character described, a box, a pendulum indicator mounted within the box, a numerical scale coöperating with said pendulum indicator, said scale having letters adjacent to predetermined parts of said numerical scale to accentuate said predetermined parts of said numerical scale, said box having a lid and a mirror carried by said lid to reflect said indicator and said scale.

2. In an instrument of the character described, a box, a pendulum indicator mounted within the box, a numerical scale, and a lettered scale coöperating with said pendulum indicator, and with said numerical scale to accentuate predetermined parts of said numerical scale, said box having a lid, a mirror carried by said lid to reflect said pendulum indicator and scales, and means operated by said lid preventing movement of said pendulum indicator when said lid is closed.

3. In an instrument of the character stated, a pivot pin, a pendulum indicator mounted on said pin, a compass needle mounted on said pin, and means for holding said indicator and compass needle immovable at times.

4. A surveying instrument comprising a box having a chamber, a pivot pin in said chamber, a pendulum indicator having a bearing portion mounted on said pin, a compass needle mounted on said pin, said box having a lid, and means controlled by said lid for holding said indicator and compass needle immovable when the lid is closed.

5. A surveying instrument comprising a box having a chamber, a pivot pin in said chamber, a pendulum indicator having a bearing portion mounted on said pin, a compass needle mounted on said pin, said box having a lid, means controlled by said lid for holding said indicator and compass needle immovable when the lid is closed, said last named means comprising a lifter having an aperture to permit passage of said pin, and engaging the bearing of said pendulum indicator to move said pendulum indicator into engagement with said compass needle.

6. A surveying instrument comprising a compass box, a compass needle and a pendulum mounted within said box, said box having a lid, a mirror mounted on the lid of the box for reflecting said pendulum, a lifter mounted within said box to coöperate with said pendulum and said compass, and means movable by the lid of said box for operating said lifter to move said pendulum into engagement with said compass needle to hold said needle and said pendulum immovable.

7. A surveying instrument including a box, a bearing pin mounted in said box, a pendulum mounted on said bearing pin, scales to coöperate with said pendulum, said box having a lid, a mirror mounted on said lid to reflect said scales and pendulum, a lifter mounted within said box, and means movable by the lid of said box for operating said lifter to hold said pendulum immovable when the box lid is closed.

8. A surveying instrument including a box, a bearing pin mounted in said box, a pendulum mounted on said bearing pin, scales coöperating with said pendulum, said box having a lid, a lifter mounted within said box, and means movable by the lid of said box for operating said lifter to hold said pendulum immovable when the box lid is closed.

9. In an instrument of the class described, a box having a lid and a straight edge, a pair of sights, one of which is mounted on said box and the other is mounted in said lid, a foldable scale carried by one of said sights and coöperating with the other sight, a graduated scale within said box and a pendulum indicator coöperating with said graduated scale, substantially as shown and described.

10. In an instrument of the character stated, a log scale and a gravity actuated indicator coöperating therewith, a box in which the aforesaid parts are mounted, said box having a straight edge and a slotted scale plate mounted on the end of said box through which sighting may take place along said straight edge.

11. In an instrument of the character stated, a box having a lid and a straight edge, a sighting plate secured to said box adjacent to said straight edge, a second sight secured to the lid to coöperate with said sighting plate, a scale hinged to said sighting plate, said second sight having a cut-away portion to receive said scale to coöperate therewith, substantially as shown and described.

12. In an instrument of the character stated, a log scale and a gravity actuated indicator coöperating therewith, a box in which the aforesaid parts are mounted, said box having a straight edge and a lid, a sight carried by said lid, a sight carried by said box adjacent to said straight edge, and a scale coöperating with said sights, all being arranged that the diameter of a tree at a particular place and the distance of such particular place from the ground may be substantially simultaneously observed.

13. In an instrument of the character stated, a box having a chamber, a pivot pin projecting into said chamber, a pendulum having a bearing pierced by said pin, a compass needle mounted on said pin, a needle lifter for raising said compass needle off of said pin, said box having a lid, and means controlled by said lid for operating said needle lifter to lift the needle when the lid is closed and hold said pendulum immovable.

14. In an instrument of the character stated, a box having a chamber, a pivot pin projecting into said chamber, a pendulum having a bearing pierced by said pin, a compass needle mounted on said pin, a needle lifter for raising said compass needle off of said pin, said box having a lid, means controlled by said lid for operating said needle lifter to lift the needle when the lid is closed, means for restoring said needle lifter to its initial position to disengage the compass needle when the lid is opened, said last named means comprising a forked member carried by said pendulum between the arms of which said needle lifter projects and scales coöperating with said compass needle and with said pendulum.

15. In an instrument of the character stated, a box having a chamber, a pin projecting therein, a gravity actuated indicating pendulum having a forked bearing pierced by said pin and provided with a pointer, a scale coöperating with said pointer, a compass mounted on said pin, a lifter mounted within the box, and projecting between the arms of the forked bearing member of said pendulum to lift said pendulum into engagement with said needle to hold said needle and pendulum immovable at times, substantially as shown and described.

16. In an instrument of the character stated, a box having a chamber, a pin projecting therein, a gravity actuated indicating pendulum having a forked bearing pierced by said pin and provided with a pointer, a scale coöperating with said pointer, a compass mounted on said pin, a lifter mounted within the box, and projecting between the arms of the forked bearing member of said pendulum, said box having a lid, and means carried by said lid for operating said lifter when the lid is closed to raise said forked bearing into engagement with said needle to hold said pendulum and the needle immovable.

17. A surveying instrument consisting of a box having a lid and a straight edge, a pair of sights, one of which is provided with a sighting slot and mounted on said box, and the other being mounted on said lid, a foldable scale coöperating with said sights, a bearing pin mounted within said box, a gravity actuated pendulum having bearing to engage said pin and having a pointer, scales coöperating with said pointer, and a mirror carried by said lid.

JOSEPH BARBOW.

Witnesses:
A. T. LEWIS,
C. A. SHEPPARD.